Figure 1:
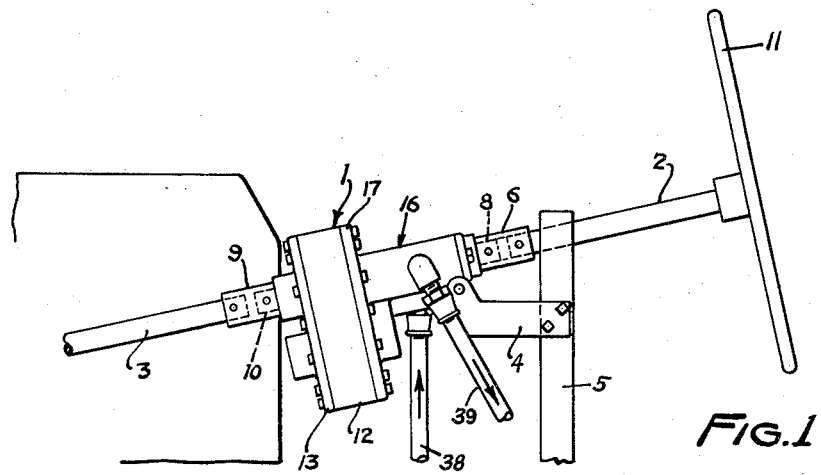

Oct. 7, 1958  J. H. BE VIER  2,854,955
POWER STEERING APPARATUS
Filed Aug. 5, 1955  5 Sheets-Sheet 1

INVENTOR.
JOSEPH H. BeVier
BY
*Paul Moore & Klugger*
ATTORNEYS

Oct. 7, 1958
J. H. BE VIER
2,854,955
POWER STEERING APPARATUS
Filed Aug. 5, 1955
5 Sheets-Sheet 3
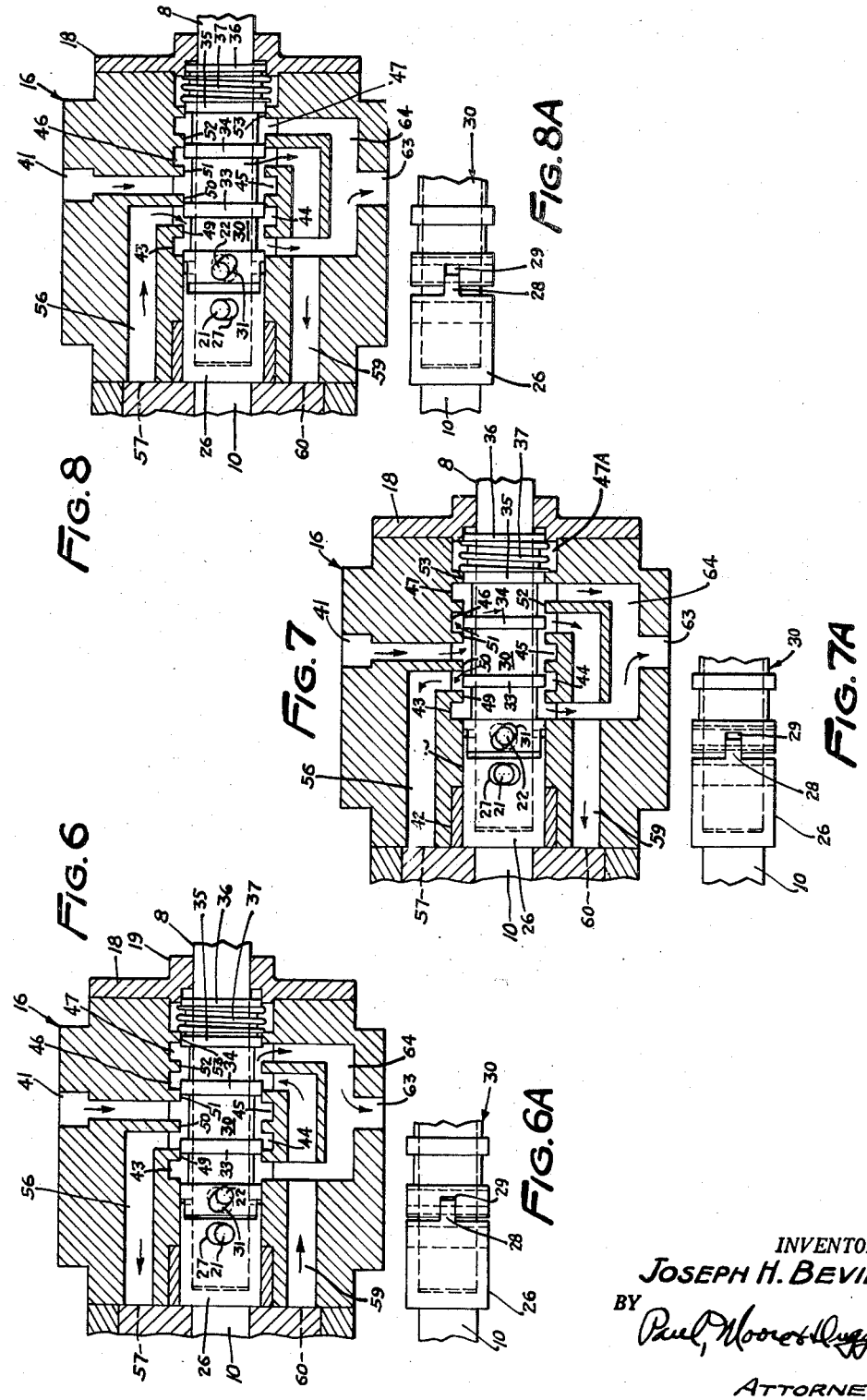
INVENTOR.
JOSEPH H. BEVIER
BY
ATTORNEYS Oct. 7, 1958 J. H. BE VIER 2,854,955
POWER STEERING APPARATUS
Filed Aug. 5, 1955 5 Sheets-Sheet 4

INVENTOR.
JOSEPH H. BEVIER
BY
*Paul, Moore & Dugger*
ATTORNEYS

United States Patent Office 2,854,955
Patented Oct. 7, 1958

2,854,955
POWER STEERING APPARATUS
Joseph H. Be Vier, Minneapolis, Minn.
Application August 5, 1955, Serial No. 526,744
23 Claims. (Cl. 121—41)

This invention relates to a power steering device intended to assist in the steering of almost any wheeled type ground travelling vehicle. In use the invention applies power upon demand to the steering linkage of the vehicle being controlled and in so doing, not only moves the linkage to whatever position is desired by the operator (thus moving the wheels to the position desired by the operator) but relieves the operator of most of the physical effort otherwise required to move the linkage and wheels. Further, it operates to absorb road shocks acting on the steerable wheels of the vehicle and prevents these shocks from reaching the steering wheel. This shock absorbent action of the invention tends to hold the vehicle on the course purposely set by the operator since it prevents deflection of the steerable ground engaging wheels from the shock caused by ground irregularities.

Thus, broadly the invention gives power assistance in turning vehicles, and absorbs road shocks and tends to hold the established course of the vehicle.

The instant invention derives power from hydraulic fluid flowing under pressure from a pump driven by the vehicle engine. The invention comprises a control valve and a hydraulic motor. Pressure oil from a pump enters the control valve which directs the oil to the motor, through it and out of the discharge line through which it returns to the reservoir and ultimately to the pump intake to complete the flow cycle. The valve is actuated by the vehicle operator as he moves the steering wheel. Motion of the steering wheel shifts the valve and causes it to direct the pressure out to whichever "side" of the motor is proper to assist the steering wheel turning.

When the operator stops turning the steering wheel, the valve seeks its center position (neutralizes) and the oil merely circulates through the valve without applying pressure in any steering direction. The valve permits continuous circulation of oil throughout the entire device while in the neutral position rather than impeding the flow of the oil through any passages. This continuous circulation promotes instant availability of power when demanded by change in valve position.

The valve is positioned on the steering wheel (or operator) end of the motor and is designed to be responsive only to actuation by the steering wheel (the steerable wheels operate the valve in reverse. The feature allows it to properly direct oil to give power assistance at the discretion of the operator while resisting any change in setting (any motion in the steering column) which may come from the steerable wheel end of the motor. Thus, there is provided power as needed and directed and absorption of road shock and a tendency to hold the vehicle on its established course.

The subject invention is also intended to serve as an integral "package" unit consisting of a control valve and motor (power applicator). It is intended to be installed in the steering column of the vehicle at any convenient location between the steering wheel and the worm and sector (or worm and recirculating ball) unit.

Further, although practical for installation in any vehicle having a rotary control element (steering column) it is intended principally for installation of wheel-type farm tractors.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

Figure 2:
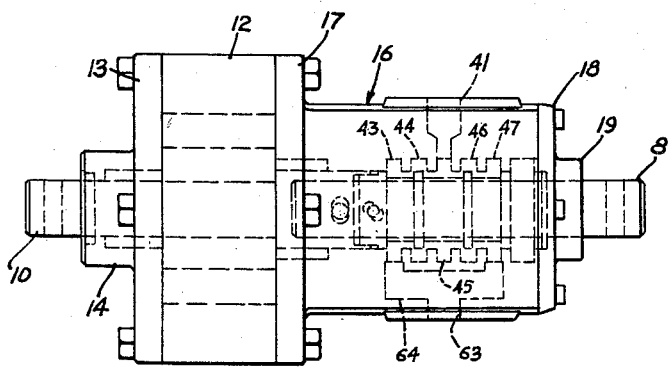
Figure 3:
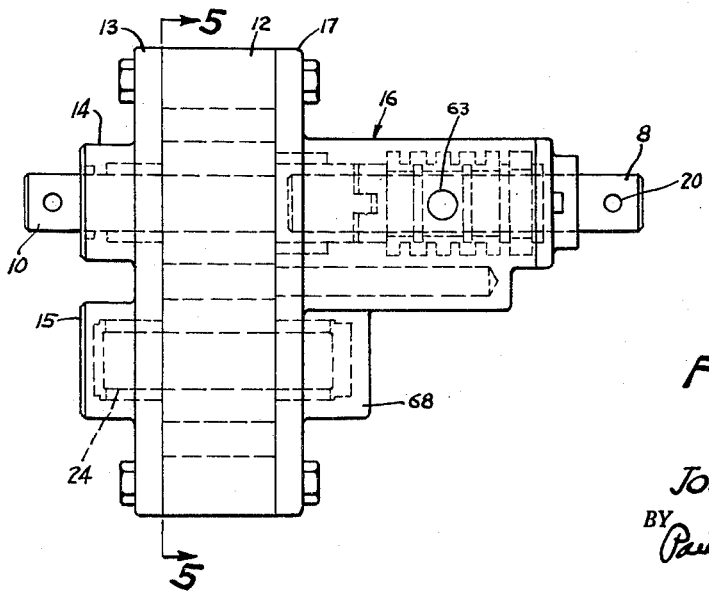
Figure 4:
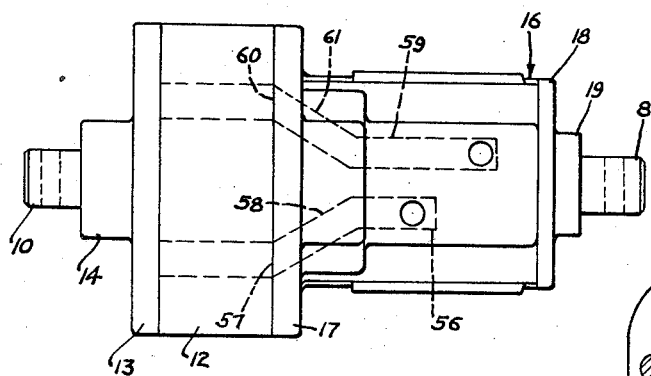
Figure 5:
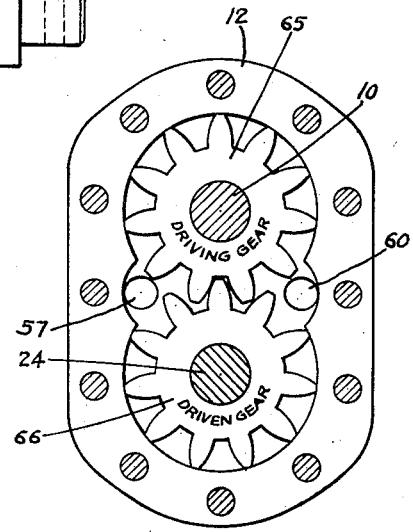
Figure 17:
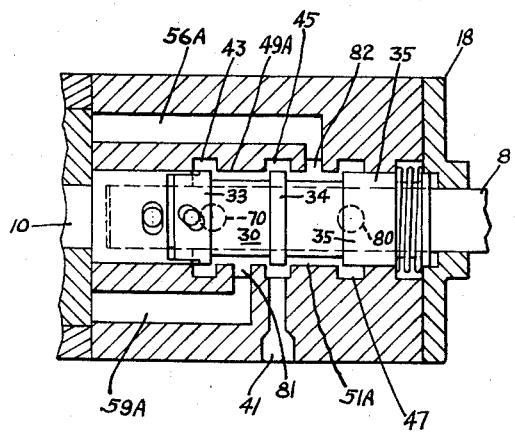
Figures 1, 2, 9:
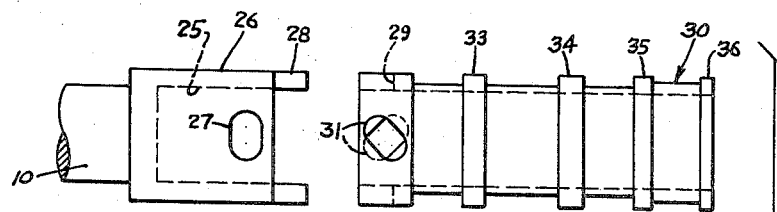
Figures 3, 9:
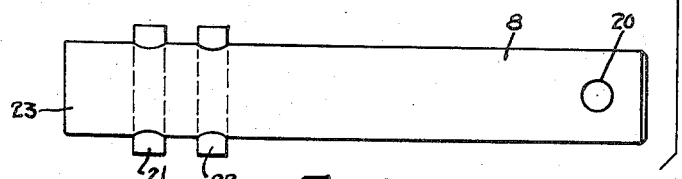
Figure 10:
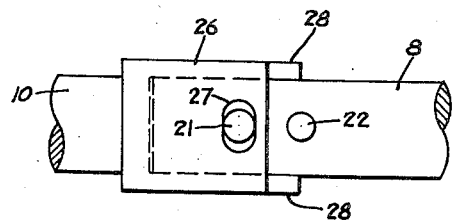
Figure 11:
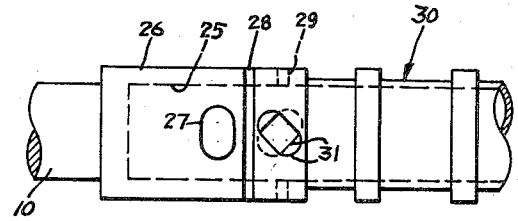
Figure 12:
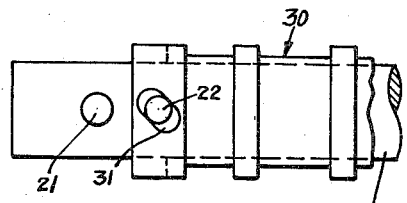
Figure 13:
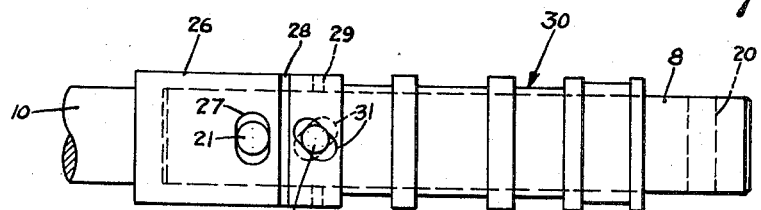
Figure 14:
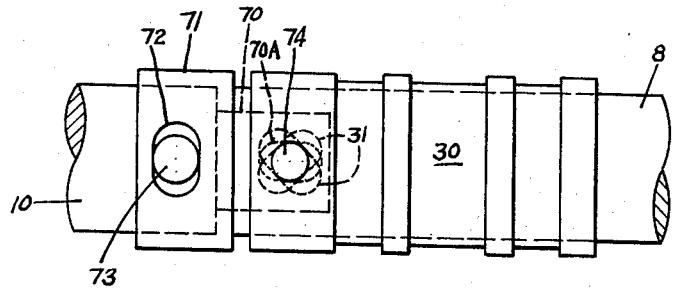
Figure 15:
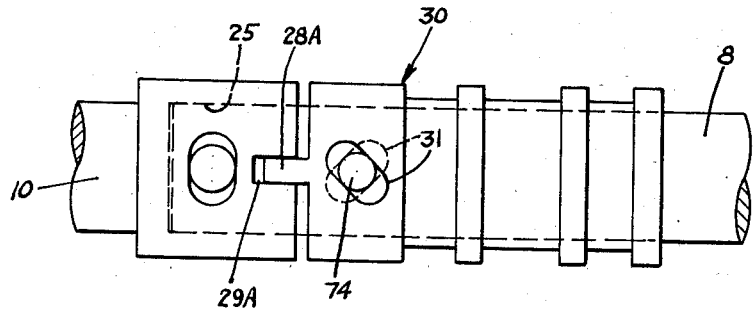
Figure 16:
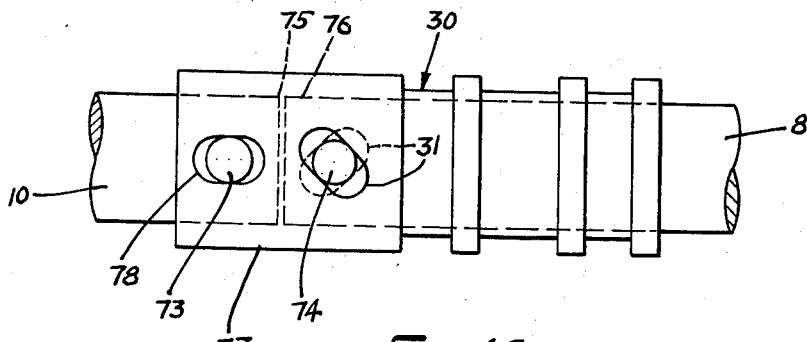

This invention will be described with reference to the drawings in which corresponding numerals refer to the same parts and in which:

Figure 1 is an assembly view of the invention installed in a vehicle steering column;
Figure 2 is a top plan view of the invention;
Figure 3 is a side elevational view;
Figure 4 is a bottom plan view;
Figure 5 is a vertical section taken along the line and in the direction of the arrows 4—4 of Figure 3;
Figure 6 is a schematic, roughly horizontal section through the valve of the instant invention showing the valve in left turn position;
Figure 6A is a fragmentary side elevational view showing the valve sleeve in the left turn position of Figure 6;
Figure 7 is a view similar to Figure 6 but showing the valve in neutral position;
Figure 7A is a view similar to Figure 6A but showing the valve sleeve in the neutral position of Figure 7;
Figure 8 is a view similar to Figures 6 and 7 but showing the valve in right turn position;
Figure 8A is a view similar to Figures 6A and 7A but showing the valve sleeve in the right turn position of Figure 8;
Figure 9 is an exploded view showing the individual components of the valve plunger assembly in exploded position;
Figures 10–12 are partially elevational and partially diagrammatic views showing the various forms of motion between the individual components of the valve plunger assembly;
Figure 13 is an elevational view of the valve plunger assembly;
Figure 14 is a view similar to Figure 13 but showing a modified form of assembly;
Figure 15 is a view similar to Figures 13 and 14 but showing a third modified form of assembly;
Figure 16 is a view similar to Figures 13–15 but showing a fourth modified form of assembly; and
Figure 17 is a view similar to Figure 6 but showing a modified form of housing and valve sleeve.

With reference now to the drawings and particularly with reference to Figure 1, there is shown my hydraulic steering booster or power unit assembly 1 interposed in the steering column of a vehicle connected at one end to the steering wheel shaft 2 and at the other end to steering linkage shaft 3.

As will be appreciated by inspection of Figure 1, the power unit assembly 1 may be "a conversion unit" in which instance the linkage shaft 3 and the steering wheel shaft 2 are separated portions of the original steering column of the vehicle with a portion removed to accommodate the assembly 1 or the assembly 1 may be original equipment in which instance shafts 2 and 3 will have been individual since inception.

The assembly 1 may be supported upon the vehicle by any suitable bracing, in this instance by a pair of elbow braces 4 fixed at one end to the vehicle steering column support 5 and at the other end to assembly 1, one on either side thereof.

The assembly 1 is joined to shaft 2 by a sleeve 6 pinned thereto, sleeve 6 also being pinned to a valve shaft 8. The assembly 1 is connected to linkage shaft 3 by a similar sleeve 9, pinned thereto and also pinned to driving gear shaft 10. Thus, when the steering wheel 11 is rotated, shaft 2, sleeve 6 and shaft 8 will rotate as a unit. When the gear shaft 10 is rotated sleeve 9 and linkage shaft 3 will likewise rotate as a unit.

The power unit assembly 1 comprises a center housing 12, forming a motor chamber which houses the two spur gears of a fluid operated motor which gears are enmeshed and are rotated by the application of hydraulic pressure oil to provide power assistance to the steering as subsequently explained.

The center housing is of the configuration shown best in Figures 2–5.

Secured to the center housing at one end by bolts or other suitable means is a front end plate 13 which forms a front cover for the center housing or motor structure and is provided with a central apertured boss 14 providing a bearing for the driving gear shaft 10, and a second closed boss 15 which serves as a bearing for a gear shaft 24.

Secured to the other end of the central housing 12 is a valve body 16 of the configuration shown best in Figures 2, 3 and 4 which forms a rear cover for the center housing and is provided with suitable ports and passages to direct oil into and throughout the valve and motor sections, also explained more fully hereinafter.

The valve body or chamber 16 is secured to the center housing 12 by a flanged end 17 bolted or otherwise suitably joined thereto. For clarity bolts have been left off in Figures 2 and 3.

Joined to the rear end of the valve body 16 (right and with reference to Figure 2) is a rear end plate 18 or cap provided with a central boss 19 serving as a bearing for the valve shaft 10. Plate 18 is likewise usually bolted to body 16 but the bolts are omitted in Figures 1 and 3 for clarity.

As will be appreciated with reference to Figures 2–4, suitable bearings and seals are provided for shafts 8 and 10 but since they form no part of this invention, of themselves, will not be described in detail.

The valve shaft 8, as shown in the exploded view, Figure 9, connected to the steering shaft 2, is provided with three apertures, in one of which 20 is positioned the pin joining it to sleeve 6 and in the other two of which are positioned pins 21 and 22, pin 21 being positioned closest to the end 23 of shaft 8.

The end 23 of shaft 8 is positioned in the well 25 formed in the enlarged head 26 of shaft 10. Head 26 is provided with a pair of opposed elongated apertures 27 in which the ends of pin 21 are positioned.

The elongated apertures 27 extending circumferentially on the enlarged head 26 allow the ends of pin 21 and consequently shaft 8 to rotate slightly before shaft 10 will of necessity rotate with it by the engagement of the ends of pin 21 with the respective ends of slots 27.

The head 26 carries a pair of male members 28 which cooperate with a pair of female guideways 29.

Valve sleeve 30 is provided at its left end with reference to Figure 8 with a pair of helical cam grooves 31 located diametrically opposite one another and cut to operate together in the manner of a right hand screw thread.

The valve sleeve 30 is provided with lands 33, 34, 35 and 36. A centering spring 37 is mounted on the valve sleeve 30 between the lands 35 and 36 for operation as later described.

The valve body 16 is provided with an inlet conduit 38 and an outlet conduit 39 through which fluid under pressure is adapted to enter and exit. The inlet conduit leads to a source of fluid under pressure to receive fluid therefrom and the outlet conduit returns the fluid to its source.

The valve body 16 as shown best in Figure 2 is provided with an inlet port 41 which receives fluid under pressure from conduit 38. The valve body is also provided with a plurality of annular grooves 43—47 separated by a plurality of lands 49—53. An axial passageway 56 leads to the center housing at 57 through an angled portion 58 and terminates at its other end in groove 44.

A second axial passage 59 opens into the center housing at 60 through angled portion 61. It terminates at its other end in groove 46.

An outlet port 63 is connected by an axial channel 64 to grooves 47 and 43 as shown best in Figure 2.

A driving gear 65 (a spur gear) is fixed to the driving gear shaft 10 as shown in Figure 5 and meshes with a driven gear 66 positioned on a stub shaft 24, the stub shaft being journalled in boss 15 and a cooperating boss 68 as shown in Figure 3.

When the assembly is in the at-rest position of Figures 7–7A, or neutral position, fluid under pressure flows through conduit 38, port 41, to groove 45, and from thence it diverges into grooves 43, 44, 46 and 47. From grooves 43 and 47, fluid flows through passageways 64 and 63 and is discharged into conduit 39 through which it returns to the reservoir. From grooves 44 and 46 fluid flows into passageways 56 and 59 respectively and then to the central housing 12 through ports 57 and 60. Simultaneous flow to both sides of gears 65 and 66 equalizes any pressure on the gears thereby preventing any tendency for the gears to turn. Fluid thus freely circulates throughout the valve.

When it is desired to turn the vehicle to the left, the steering wheel 11 is rotated in a counterclockwise or left direction and through shaft 2 and sleeve 6, rotates the valve shaft 8 to the limit of travel of the pin 21 which pin, passing through the valve shaft 8 and the driving gear shaft 10, provides a limited amount of travel in slots 27 in driving gear shaft 10. Hence, the pin 21 operating in the slots 27 located diametrically opposite one another in the enlarged head 26 of the driving gear shaft 10, allows a slight rotation of the valve shaft 8 with no corresponding motion of the driving gear shaft 10, which is called "lost motion" and is the motion which actuates the valve of the power unit assembly.

Since pin 22 also passes through the valve shaft 8 it likewise rotates counterclockwise the same angular amount as pin 21. However, pin 22 passes through the valve sleeve 30 as well as the valve shaft 8 and operates in the helical cam grooves 31, located diametrically opposite one another in the front end of the valve sleeve and cut to operate together in the manner of righthand screw thread.

As pin 22 rotates, it slides in the cam grooves 31 thereby forcing the valve sleeve 30 to slide forward in relation to the valve body 16. The mating slots 29 and members 28, members 28 being on the driving gear shaft 10 and slots 29 on the valve sleeve 30, force the sleeve 30 to slide rather than rotate with the pin 22 (which action might otherwise result due to the friction existing between the pin 22 and the cam grooves 31) since members 28 and slots 29 cooperate to permit only linear relative motion between the driving gear shaft 8 and the valve sleeve 30.

Thus, the valve assembly assumes the position of Figures 6 and 6A. In this position lands 33 and 34 of valve sleeve 30 move into sliding contact with lands 49 and 51 of the valve body thereby effectively closing off any fluid travel past these sliding contact areas. At this stage, fluid under pressure will enter port 41, travel through groove 45 and thence through axial passage 56 and discharge through aperture 57 to turn gear 66 counterclockwise with reference to Figure 5 and gear 65 clockwise with reference to that figure. Fluid relieved from pressure will then exhaust through aperture 60 and passageway 59 and thence through grooves 46 and 47 to passageway 64 and thence outwardly through outlet port 63 back to the reservoir. The motion of the gears 65 and 66 is such as to be in the direction of a lefthand turn for shaft 8 and thus gives powered assistance to the turning effort.

The action above described will continue as long as the operator continues to move the steering wheel 11 of the vehicle in the direction of a lefthand turn. However, when the operator stops rotating the steering wheel, shaft 8 stops rotating. The fluid under pressure will continue to flow as described above for a brief time until the gears and driving gear shaft move far enough to position the pin 21 in the center of slots 27. Simultaneously, cam slots 31 move to position pin 22 in their centers and, in so doing, force valve sleeve 30 to slide rearwardly to the neutral position of Figures 7 and 7A. When this new valve position is assumed, powered steering assistance ceases.

When the valve is in neutral, the lands 33 and 34 are centered under corresponding grooves 44 and 46 in the valve body (see Figure 7). Because the lands 33 and 34 are slightly narrower than the grooves 44 and 46, clearance exists between their edges which permits oil to circulate freely past these points and into all oil spaces in the valve. This action dissipates all pressure differences which may exist and maintains oil circulation for immediate use whenever another steering action is made.

When a right turn is made, the steering wheel 11, shaft 2 and hence valve shaft 8 is rotated clockwise, moving pin 21 to the other end of the slots 27, moving pin 22 against cam slots 31, forcing the valve sleeve 30 to move rearwardly with respect to the valve body 16. Lands 33 and 34 of the valve sleeve 30 move into close sliding contact with lands 50 and 52 in the valve body, closing off any fluid travel past these sliding contact areas. Thus, fluid under pressure enters port 41, passes through groove 45 and thence through groove 46 into the axial passageway 59 and thence discharges at 60 into the motor chamber, all as shown by the direction of the arrows in Figure 8. As with a lefthand turn, the pressure differential across the gears 65 and 66 moves the gear 65 in a counterclockwise direction with reference to Figure 5 and gear 66 in a clockwise direction with reference to that figure, thus turning shaft 10 in the direction of a righthand turn and giving power assistance to the turning effort. The fluid moves through port 57 and passageway 56 into annular groove 44 from whence it flows into annular groove 43, through passageway 64 out of outlet port 63 and is discharged through conduit 39 to the reservoir. Thus, the valve assumes the position shown in Figure 8.

As before, when the operator stops his righthand turning motion, the valve will neutralize and the power assistance will cease.

As will be seen with reference to Figures 6, 7 and 8, the centering spring 37 trapped in the annular groove or chamber 47A bears against both the land 53 and cap 18 as shown. Spring 37 is placed under compression by motion of the valve sleeve in either direction and consequently constantly urges the valve sleeve into neutral position, which action prevents an over-steering or tendency of the valve to remain open too long and provides driving feel for the operator by applying a drag on the valve sleeve 30 which the operator must overcome by turning the steering wheel. This gives the driver the feeling of turning the wheels. It will be noted that when the valve sleeve 30 is in the position of Figure 6, the spring 37 is compressed between land 53 and land 36 and when the sleeve is in the position of Figure 8, the spring is compressed between the end plate 18 and land 35.

While the above description describes the fluid flow and resultant power assistance as taking place when the valve reaches either extremity of its travel, the hydraulic motion starts practically as soon as the valve starts to move. In actuality, for light turning efforts, it is probable that the valve sleeve never reaches the extremity of its travel. The clearances between the lands and the grooves in which they center are such that the slightest motion of the valve sleeve closes one of the clearances sufficiently to create considerable pressure increase on the side of the land which opens into a pressure passage. This pressure will start operating on the gears and will move the gears whenever the pressure becomes great enough to overcome external resistance of the steering column. Obviously, the valve sleeve will continue to move toward an operating position until sufficient pressure is applied to the gears to move the steering column.

The invention absorbs shock in the following manner. When the steerable wheels of the vehicle are deflected from their established course, their turning reacts through the steering system to rotate the steering linkage shaft 3 in the direction of the wheel's deflection. Because this shaft is connected with driving gear shaft 10, shaft 10 will rotate with the linkage 3. This rotation will rotate slots 27 with reference to pins 21 and through the male members 28 and guideways 29, will move the cam slots 31 relative to pins 22. The entire sequence of motion moves the valve sleeve 9 into an operating position; but because it was initiated from the steerable wheel end of the mechanism, and was accomplished in reverse of normal operating manner, the new operating position of the valve sleeve is for a turn opposite to the direction of deflection. Thus, the mechanism automatically moves to counteract the deflection, and will continue to move in this counteracting direction until the valve sleeve is returned to neutral.

In the event of hydraulic failure, mechanical steering is preserved through the connection of the valve shaft 8 with driving gear shaft 10 by pin 21.

A fuller understanding of the various forms of motion between the valve shaft 8, driving gear shaft 10 and valve sleeve 30 may be had with reference to Figures 10–12.

Thus, in Figure 10, it will be seen that valve shaft 8 is not permitted to move linearly with reference to driving gear shaft 10 but only rotatively by virtue of pin 21 in slot 27. Hence, there is simple pure rotational movement between valve shaft 8 and driving gear shaft 10.

Yet in Figure 11 valve sleeve 30 is only permitted to move linearly with reference to driving gear shaft 10 by virtue of the male members 28 in cooperation with the guideways 29. Thus, there is simple pure linear motion between valve sleeve 30 and driving gear shaft 10.

Between valve shaft 8 and valve sleeve 30 there is a combined linear and rotational motion provided by the positioning of pins 22 in cam grooves 31 as shown in Figure 12.

The various parts 8, 10 and 30 have only these relative motions as illustrated in Figures 10–12 when in assembled position as in Figure 13. Likewise, the same motions between the parts are present in the modifications of Figures 14–16.

In Figure 14 there is shown a modified form of the assembly of Figure 13, in which the driving gear shaft 10, instead of being provided with an enlarged head is provided with a reduced end portion 70. The valve shaft 8 is provided with an enlarged head 71 provided with an aperture 72 in which pin 73 positioned in shaft 10 is placed. Thus, shaft 8 may merely rotate with reference to shaft 10 by virtue of the positioning of pin 73 in elongated slot 72.

A second pin 74 is positioned in sleeve 30, engaging the cam slots 31 in shaft 8 and elongated aperture 70A in the reduced end of shaft 10, and sleeve 30 is thus permitted to move only linearly with reference to shaft 10 but linearly and relatively with reference to shaft 8.

In the modification of the assembly shown in Figure 15 the shaft 10 is provided with the central well 25 but is not provided with the male members 28. In this modification the shaft 10 is provided with guideways 29A similar to the guideways 29 in the assembly of Figure 13 and the valve sleeve 30 is provided with the male members 28A similar to members 28 for the assembly of Figure 13. The relative motions are the same.

In the modification shown in Figure 16 the shaft 10 is provided with the pin 73 but terminates at 75. The shaft 8 is provided with the pin 73 but terminates at 75. The shaft 8 is provided with an end 76 in which is positioned pin 74. The diameters of pins 75 and 76 are equal. In this modification the sleeve 30 is provided with an enlarged end 77 having an elongated aperture 78 in which pin 73 resides and the cam grooves 31 in which pin 74 resides. The relative motions are the same.

In Figure 17 there is shown a modification of the valve assembly in which the sleeve 30 is provided with lands 33, 34 and 35 but lands 33 and 35 are enlarged as shown, land 34 is centered under groove 45 and lands 33 and 35 are positioned under grooves 43 and 47 as shown. In this modification, grooves 44 and 46 are omitted and land 49A is an elongated version of land 49 of the modification of Figures 1-8 and the land 51A is an elongated version of land 51 of the modification of those figures. Likewise, in the modification of Figure 17, lands 50 and 52 are omitted.

In this modification, the ports 70 and 80 for passageway 64 are positioned as shown and passageway 59A, similar to passageway 59 is ported at 81 between lands 33 and 34 instead of beneath land 34 as in Figures 1-8 and passageway 56A similar to passageway 56 is ported at 82 between lands 34 and 35 rather than opposite land 33 as in the modification of Figures 1-8.

The operation of this modification is of course similar to the operation for the modification of Figures 1-8 as explained with reference thereto.

Thus, when it is desired to turn the vehicle to the left, the steering wheel 11 is rotated as explained previously in column 4 with the effect that the sleeve 30 will slide leftwardly with reference to Figure 17 until land 34 of the valve sleeve 30 moves into sliding contact with land 49A of the housing and land 35 of the valve sleeve 30 moves in sliding contact with land 51A of the housing. In this position, fluid will enter the port 41, travel through the groove 45 and thence through groove 82 and passageway 56A and emerge at 57, rotating the driving gear and driven gear for a left turn as previously explained with reference to the modification of Figures 6-8. Fluid will discharge through port 60 and passageway 59A and through port 70 to passageway 64 and from outlet port 63 back to the reservoir.

When the valve is neutral, the plunger assembly 8, 26, 30, will assume the position shown in Figure 17 and fluid under pressure will enter port 41, travel through groove 45 and thence through groove 82 and passageway 56A, and at the same time through groove 81 and passageway 59A neutralizing gears 65, 66. Likewise, oil will exhaust through ports 70 and 80 to passageway 64 and thence through outlet port 63.

When a right turn is being made, the steering wheel 11 will be moved rightwardly as explained with reference to the modification of Figures 6-8, column 5, and land 34 will move into communication with land 51A, land 33 will move into communication with land 49A and oil under pressure will flow through inlet port 41, thence through groove 45 into port 81 and through passageway 59A discharging into the valve body at 60 and rotating gears 65 and 66 for a right turn as previously explained with reference to the modification of Figures 6-8. Fluid will discharge through port 57, passageway 56A and port 82, thence through outlet port 80, passageway 64 and outlet 63 to the reservoir.

As many widely differing embodiments of this invention may be made without departing from the spirit and scope thereof, it is to be understood that the specific embodiments described are given by way of example only and the invention is limited only by the terms of the appended claims.

What is claimed:

1. A hydraulic steering mechanism comprising in combination a housing, means admitting fluid under pressure to said housing and means discharging fluid from said housing, a steered shaft section rotatably positioned within said housing and having a portion extending therefrom, and a steerable shaft section rotatably positioned in axial alignment with said steered shaft section and also positioned within said housing and having a portion extending therefrom, said steered and steerable shafts having ends in juxtaposition, a valve means engaging said juxtaposed ends and movable in response to motion of said steerable shaft section and a hydraulic means positioned within said housing and on said steered shaft and controlled by said valve means for rotatably moving said steered shaft.

2. The apparatus of claim 1 further characterized by means providing a lost motion connection between said steered shaft and said steerable shaft.

3. The apparatus of claim 1 further characterized by pin and slot connecting means between said steered shaft and said steerable shaft.

4. The apparatus of claim 1 further characterized by means whereby said steerable shaft is rotatable with reference to said steered shaft, said valve member is slidable with reference to said steered shaft and said valve member is rotatable and slidable with reference to said steerable shaft.

5. The apparatus of claim 1 further characterized by said fluid motor comprising rotary gear means positioned for driving said steered shaft in response to movement of said steerable shaft and in the same direction.

6. The apparatus of claim 1 further characterized by said valve sleeve having a pair of opposed and oppositely directed angular cam slots for the reception of a pin therein.

7. The apparatus of claim 1 further characterized by tongue and groove connecting means between said steered shaft and said valve sleeve.

8. In a hydraulic steering mechanism, a housing, a steerable shaft and a steered shaft positioned in axial alignment therewith and within said housing, means connecting said steered shaft to said steerable shaft and providing a limited lost motion therebetween, a valve sleeve positioned for axial translation with reference to one of said shafts and for axial translation and rotary motion with reference to the other of said shafts, means within said housing providing a hydraulic circuit and said valve sleeve cooperating therewith for controlling flow of fluid therethrough.

9. The apparatus of claim 8 further characterized by tongue and groove connecting means between said steered shaft and said valve sleeve.

10. The apparatus of claim 8 further characterized by pin and slot means connecting said steered shaft to said steerable shaft.

11. The apparatus of claim 8 further characterized by said valve sleeve having a pair of opposed and oppositely directed angular cam slots for the reception of a pin therein.

12. In a hydraulic steering mechanism, a housing, means admitting fluid under pressure to said housing and means discharging fluid from said housing, a steered shaft section positioned within said housing and extending therefrom, a steerable shaft section positioned in axial alignment with said steered shaft section and within said housing and extending therefrom and in prolongation to said steered section, a hydraulic motor positioned within said housing and means providing passages to said hydraulic motor whereby hydraulic fluid may be admitted under pressure and the motor rotated in selective directions, a valve member axially slidable in response to motion of said steerable shaft for controlling admission of fluid under pressure to said hydraulic motor, said steered shaft having a pair of oppositely disposed and circumferentially extending slots for the reception of a pin therein, said steerable shaft having a pin positioned for limited movement in said slots, said valve member being slidably positioned on said steerable shaft, a pin on said steerable shaft cooperating with a pair of oppositely disposed angular cam slots in said valve member, spring means engaging said valve member and said housing for normally positioning said valve member in neutral position and said valve member when translated selectively controlling the delivery of fluid under pressure to said hydraulic motor.

13. A hydraulic steering mechanism comprising in combination a housing, means admitting fluid under pressure to said housing and means discharging fluid from said housing, a steered shaft section positioned within said housing and a steerable shaft section positioned in axial alignment with said steered shaft section and within said housing, a hydraulic motor positioned within said housing and means providing passages to said hydraulic motor whereby hydraulic fluid may be admitted under pressure and the motor rotated in selective direction, a valve sleeve axially slidable in response to rotary motion of said steered shaft for controlling admission of fluid under pressure to said hydraulic motor, and means providing a slight amount of lost motion between said steerable shaft and said steered shaft and whereby rotation of said steerable shaft during said lost motion and in a given direction will translate said valve sleeve in a direction to provide power assistance to said steered shaft in the same direction.

14. A hydraulic steering mechanism for motor vehicles comprising in combination a housing, means admitting fluid under pressure to said housing and means discharging fluid from said housing, a steered shaft section positioned within said housing and having a portion extending therefrom and a steerable shaft section positioned in axial alignment with said steered shaft section and positioned within said housing and having a portion extending therefrom, a valve member axially movable in response to motion of said steered shaft and a hydraulic motor positioned within said housing and controlled by said valve member for moving said steered shaft, means providing a lost motion connection between said steered shaft and said steerable shaft including pin and slot connecting means whereby said steerable shaft is rotatable through a limited distance with reference to said steered shaft, said valve sleeve having a pair of opposed and oppositely directed angular cam slots for the reception of a pin therein and said steerable shaft having a pin positioned within said slots, tongue and groove connecting means between said steered shaft and said valve member whereby said valve member is slidable with reference to said steered shaft and rotatable and slidable with reference to said steerable shaft.

15. The apparatus of claim 14 further characterized by spring means engaging said valve sleeve and said housing for normally positioning said valve sleeve in neutral position.

16. In a hydraulic steering mechanism for motor vehicles, the improvement comprising a steered shaft section and a steerable shaft section in axial alignment, means connecting said steerable shaft section to said steered shaft section for limited lost rotary motion, an axially movable valve member positioned concentric with said steered and steerable shaft sections and axially movable with reference to said steered shaft, and cam means connecting said valve member to said steerable shaft whereby rotation of said steerable shaft during said lost motion will translate said valve member, and said steerable shaft being independently connected to said steered shaft through a lost motion connection.

17. The apparatus of claim 16 further characterized by resilient means normally maintaining said valve member in neutral position.

18. The apparatus of claim 16 further characterized by a housing containing a plurality of passageways for reception of and directing fluid under pressure to a hydraulic motor, a hydraulic motor positioned in said housing and having a direct connection to said steered shaft.

19. The apparatus of claim 16 further characterized by tongue and groove means connecting said valve member to said steered shaft.

20. The apparatus of claim 16 further characterized by pin and slot means connecting said steered shaft to said steerable shaft.

21. The apparatus of claim 16 further characterized by pin and cam slot means connecting said steerable shaft to said valve member.

22. The apparatus of claim 16 further characterized by pin and slot means connecting said valve member to said steered shaft.

23. A hydraulic steering mechanism comprising in combination a housing, said housing providing internal conduits controlled by a valve sleeve, means admitting fluid under pressure to said housing and means discharging fluid from said housing, a steered shaft section positioned within said housing and having a portion extending therefrom, a steerable shaft section positioned in axial alignment with said steered shaft section and also positioned within said housing and having a portion extending therefrom at the opposite end thereof, said steered and steerable shafts providing ends in juxtaposed prolongation, a valve sleeve positioned on said last ends and axially movable in response to motion of said steerable shaft section and a hydraulic motor having a gear member secured to said steered shaft for driving said steered shaft in response to movement of said steerable shaft and in the same direction and controlled by said valve sleeve, pin and slot connecting means between said steered shaft and said steerable shaft and providing a lost motion connection therebetween, said valve sleeve having a pair of opposed and oppositely directed angular cam slots for the reception of a pin therein, a pin positioned therein and connecting said valve sleeve to one of said shafts, and means connecting said sleeve to the other of said shafts and permitting axial movement thereof while precluding rotary movement thereof with reference to said connected shaft.

References Cited in the file of this patent

UNITED STATES PATENTS

| | | |
|---|---|---|
| 334,238 | King | Jan. 12, 1886 |
| 1,467,209 | Sumner | Sept. 4, 1923 |
| 1,894,098 | Janisch | Jan. 10, 1933 |
| 2,368,135 | Hamill | Jan. 30, 1945 |
| 2,410,049 | Davis | Oct. 29, 1946 |
| 2,411,119 | Stephens | Nov. 12, 1946 |
| 2,710,596 | Folkerts | June 14, 1955 |
| 2,742,021 | Geyer | Apr. 17, 1956 |

FOREIGN PATENTS

| | | |
|---|---|---|
| 666,091 | Great Britain | Feb. 6, 1952 |